United States Patent [19]

Little

[11] Patent Number: 4,627,190

[45] Date of Patent: Dec. 9, 1986

[54] APPARATUS FOR PLANTING SEED IN SEED GERMINATING TRAY

[76] Inventor: James K. Little, Rte. 6, Box 488, Concord, N.C. 28025

[21] Appl. No.: 632,324

[22] Filed: Jul. 19, 1984

[51] Int. Cl.⁴ .................. A01C 00/00; A01G 00/00; B23Q 7/04; B65G 59/00
[52] U.S. Cl. .................... 47/1 A; 221/211; 221/278
[58] Field of Search .............. 221/211, 278; 47/1 A; 111/1, 34, 77

[56] References Cited

U.S. PATENT DOCUMENTS

| 2,546,838 | 3/1951 | Tasche | 111/1 X |
| 2,771,709 | 11/1956 | Ritter | 111/2 X |
| 2,884,022 | 4/1959 | Geary | 47/1 A X |
| 3,627,173 | 12/1971 | Kerker | 111/1 X |
| 3,738,530 | 6/1973 | Fine et al. | 221/211 |
| 4,036,126 | 7/1977 | Gundersen | 47/1 A X |
| 4,106,414 | 8/1978 | Vastag | 111/1 |
| 4,251,011 | 2/1981 | Hamilton et al. | 221/211 |
| 4,411,205 | 10/1983 | Rogers | 111/34 X |
| 4,454,829 | 6/1984 | Sena | 111/2 |
| 4,480,765 | 11/1984 | Tonus | 221/211 |

FOREIGN PATENT DOCUMENTS

| 0063495 | 10/1982 | European Pat. Off. | 47/77 |
| 7310730 | 2/1975 | Netherlands | 47/1 A |
| 7803261 | 2/1979 | Netherlands | 47/1 A |

Primary Examiner—Robert A. Hafer
Assistant Examiner—D. Neal Muir
Attorney, Agent, or Firm—W. Thad Adams, III

[57] ABSTRACT

A seed planter (10) is disclosed which plants seed, one row at a time, into a plant seedling tray. A seed-receiving depression is formed in the tray by a punch (80). A seed pickup bar (18) reciprocates between a seed hopper (14) and a top seed receiving bar (19) where seed is dispensed into an aperture (20) where the seed is conveyed to the tray. The seed hopper (14) is vibrated by a motor (85) to keep the seed evenly dispersed. Seed is held on seed-receiving nozzles 21 by a vacuum pressure until discharged, when positive pressure is delivered through the nozzles (21). An entry trigger (63) and an exit trigger (64) push each tray from the entry end of the seed planter (10) through the exit end one row of compartments at a time. The seed pickup bar (18), entry triggers (63) and exit triggers (64) and punch (80) are driven by the rotation of drive motor (30). Provision is made to accommodate different sized trays. Also, microswitches (102, 103) are provided which sense the presence of a tray in seed planter (10) and permit dispensing of seed only when the tray is in seed-receiving position.

4 Claims, 9 Drawing Figures

APPARATUS FOR PLANTING SEED IN SEED GERMINATING TRAY

TECHNICAL FIELD AND BACKGROUND OF THE INVENTION

This application relates to a method and apparatus for planting seed in seed germinating trays. The invention described in this application is particularly useful for large nurseries and other agricultural businesses which plant and germinate seeds in very high quantities and require high productivity.

The germinating trays which are typically used with the invention are usually constructed of lightweight, molded plastic. Depending on the eventual size of the desired plant, the germinating tray may have any desired number of cups. Three typical sizes of cups are 4 cups wide by 12 cups deep, giving a total of 48 cups; 4 cups wide by 24 deep, giving a total of 288 cups; or, 14 cups wide by 28 cups deep, giving a total of 392 cups.

As is apparent, planting individual seeds in such a large number of small trays is extremely tedious and physically exhausting work. Even a well trained worker can plant only a small fraction of the number of seeds as is possible with the invention disclosed in this application.

In addition to high productivity, great accuracy in planting the seeds is very important. In order for the seed to properly germinate and grow to its desired height, it should be planted to a very precise depth in the exact geometric center of its cup. this is likewise very difficult for a worker to do, especially when working very rapidly in order to achieve high production.

Therefore, automatic seed planting is a very cost effective and efficient way improving productivity, and prior art seed planters are known which pick up and plant seeds one row at a time. Such a prior art apparatus is shown in the Blackmore, et al. U.S. Pat. No. 3,799,078. Blackmore discloses a seed planting apparatus (FIG. 6) which is manually operated to plant seeds in a plastic tray one row at a time by using a gang of 12 nozzles which alternately pick up a seed from a seed hopper and deposit it in a single row of a tray positioned below. However, the overall productivity of the machine is still relatively low.

Insofar as applicant is aware, no previous machine has completely mechanized the seed planting process so that seeds may be planted for extended periods of time without manual intervention.

SUMMARY OF THE INVENTION

Therefore, it is one object of the invention to provide a seed planting apparatus which is adaptable to planting seeds in a variety of different sized trays.

It is another object of the present invention to provide a seed planting apparatus which automatically indexes the tray to bring a new row of empty trays beneath the seed dispensing area of the machine in sequence with the other machine operations.

It is another object of the present invention to provide a seed planting apparatus which includes means for sensing the presence and absence of a tray in seed receiving relation and instructing the apparatus whether or not to dispense a row of seeds accordingly.

It is yet another object of the invention to provide a seed planting apparatus which automatically forms a seed-receiving depression in the soil contained in each cup.

It is yet another object of the invention to provide a seed planting apparatus which has a relatively wide range of speed adjustment so that seeds can be planted at desired rates of speed.

These and other objects and advantages of the present invention are achieved in the embodiment of the invention disclosed below by providing an apparatus for planting seed in a row of compartmented seed germinating trays which includes a seed hopper and a plurality of seed holding vacuum nozzles, each vacuum nozzle having a tip adapted to receive and hold a seed by means of vacuum applied through the nozzle. The vacuum nozzles are mounted for reciprocating motion between a seed receiving position in the seed hopper and a seed discharge position wherein a seed is released from each of the nozzles and is conveyed to the tray for discharge into respective compartments. A soil punch is provided for forming a seed-receiving depression in the soil of each compartment in the row of the tray in advance of receiving the seed. Means are provided for moving the tray forward to align an empty row of compartments in seed-receiving relation after each reciprocation of the vacuum nozzles.

The tray moving means comprise first and second tray driving arms which are positioned respectively adjacent the entry end and exit end of the apparatus frame so that either one of the first or second arms is always in tray driving relation to the tray during operation of the apparatus.

According to the preferred embodiment of the invention, the seed hopper is vibrated to evenly disperse seeds along its length for pickup by the vacuum nozzles.

Also according to the preferred embodiment of the invention, positive air pressure is applied through the nozzles onto the seed to propel them away from the nozzles to their respective tray compartments and to clear the nozzle openings to ensure proper pickup of seed during the next reciprocation.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

General Operation

Figure 1:
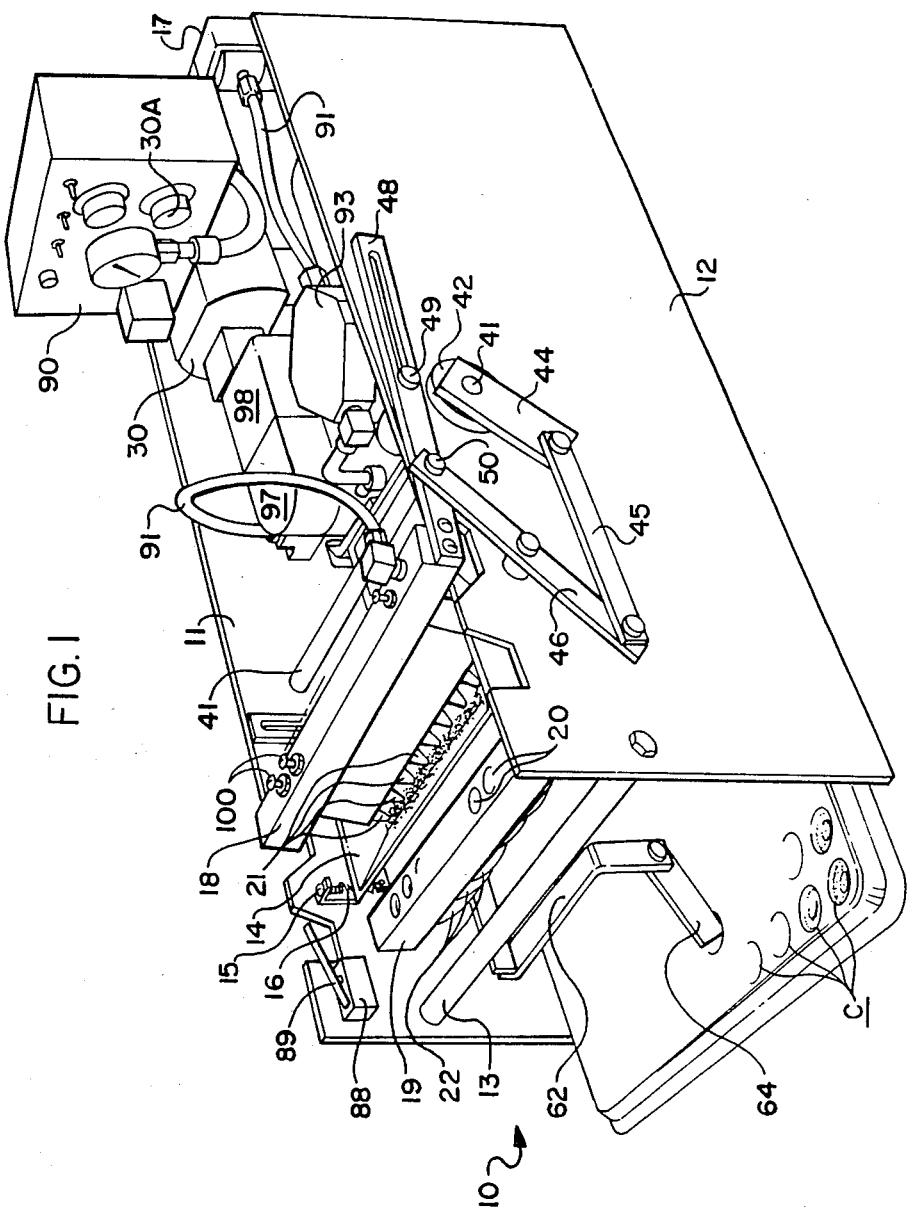
FIG. 1 is a perspective view of the apparatus for planting seed according to the present invention.

Referring now specifically to the drawings, a seed planting apparatus according to the present invention is shown and broadly designated at reference numeral 10. Seed planter 10 is housed within a pair of spaced apart and vertically extending side plates 11 and 12 which are held in spaced-apart relation by a main support bar 13 adjacent the exit end of seed planter 10 and a panel mount 17 adjacent the entry end. As is shown, the bottom of seed planter 10 is open and is adapted to receive a suitably sized seed germinating tray having a plurality of seed-receiving compartments C.

In general, seed is placed in a seed hopper 14 which extends between side plates 11 and 12. Seed hopper 14 defines a triangularly shaped cavity having an upper opening and a downwardly extending apex within which the seeds collect. Seed hopper 14 is loosely mounted by means of seed hopper hangers 15 which include springs 16. Thus mounted, seed hopper 14 is free to vibrate as will be described later. A seed pickup bar 18 is mounted for movement between between the seed hopper 14 and a top seed receiving bar 19 having a plurality of seed receiving apertures 20 therethrough. In the embodiment shown in the drawings, 12 such apertures are evenly spaced across the top seed receiving bar 19.

Figure 4:
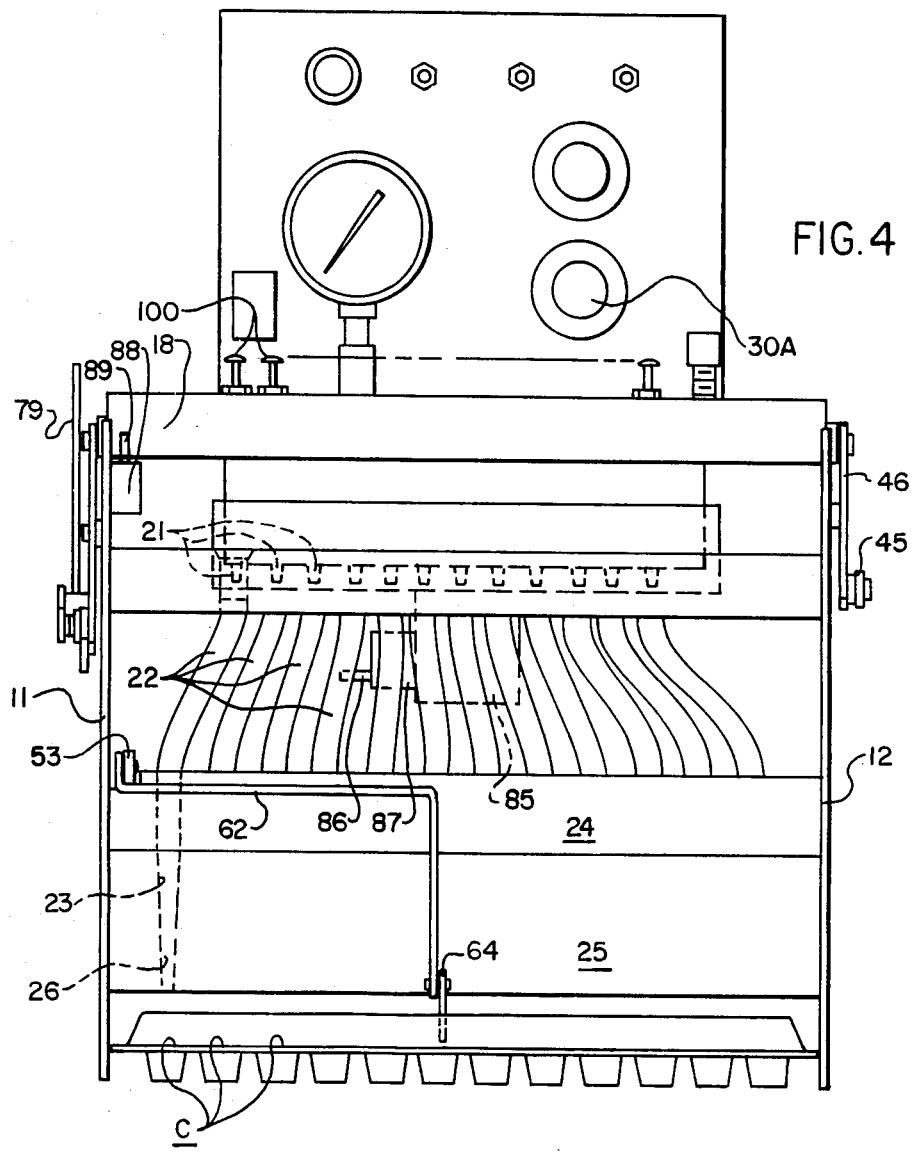
FIG. 4 is a fragmentary, front elevational view of the apparatus in seed discharge position.

Twelve vacuum nozzles 21 are mounted on the bottom side of seed pickup bar 18 and communicate therethrough with a vacuum system as will be described later. Seeds are picked up from the seed hopper 14 by the suction nozzles 21 and moved by the seed pickup bar 18 into position over the top seed receiving bar 19. At the appropriate time, the seeds are dispensed into the apertures 20 and (referring to FIG. 4) descend through 12 suitably spaced apart plastic seed delivery tubes 22 which communicate through their bottom end with a mating aperture 23 in a seed receiving bar 24. Seed receiving bar 24 is positioned above a seed delivery bar 25 having apertures 26 therein which mate and communicate with apertures 23. The seeds then fall into the tray compartments C. The tray is then indexed to the next row of compartments C and the process repeats itself.

Now that the mechanical operation of seed planter 10 has been generally described, the detailed operation of the mechanical and pneumatic functions of seed planter 10 will now be described.

Motor and Seed Dispensing Operation

Referring again to FIG. 1, the mechanical components of seed planter 10 are powered by a drive motor 30 which is mounted adjacent the main panel mount 14. The motor 30 is preferably a variable speed one and a speed control 30A is provided for this purpose.

Figure 2:
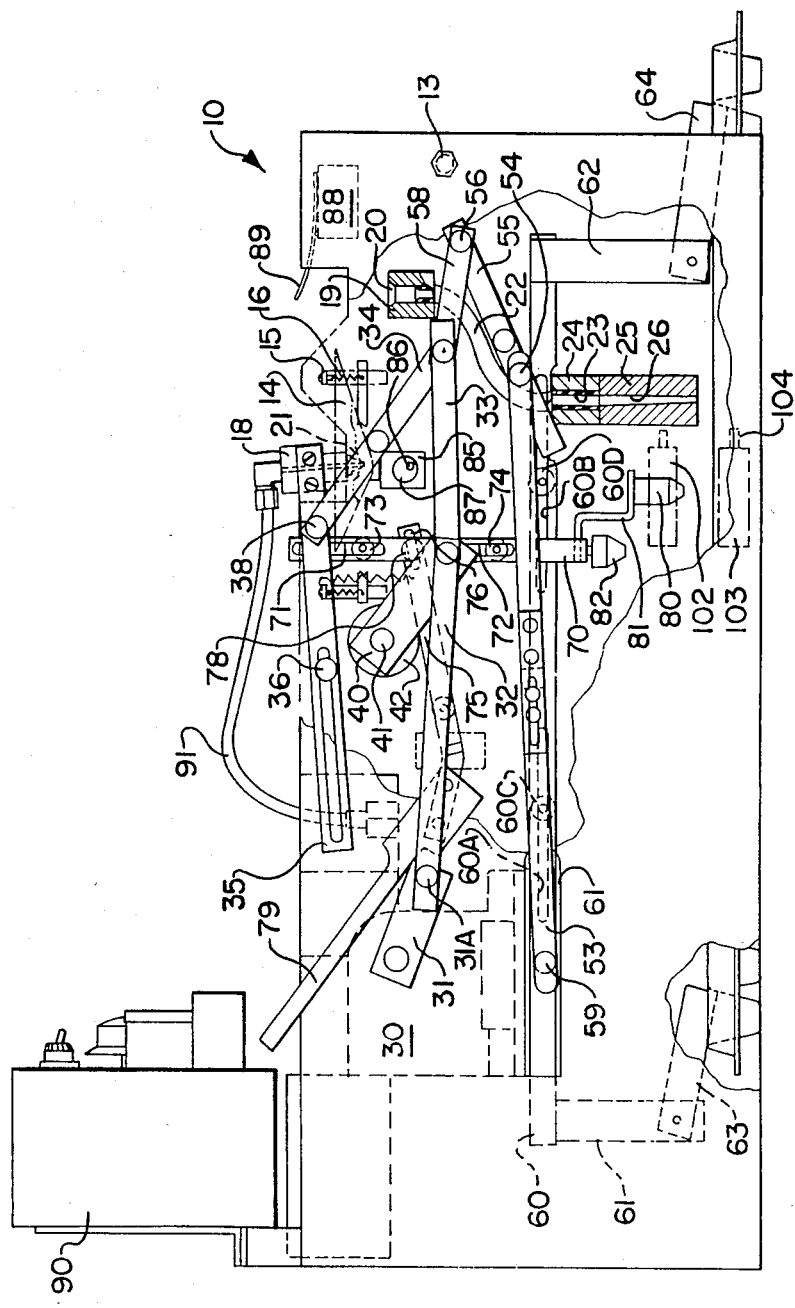
FIG. 2 is a side elevational view of the apparatus shown in FIG. 1, with parts broken away for clarity, and showing the vacuum nozzles in seed receiving relation within the seed hopper.

Referring now to FIG. 2, motor 30 rotates a motor arm 31. Motor arm 31 is positioned through a hole to the exterior of side plate 11 and is pivotally connected to a motor drive arm 32. Motor drive arm 32 is pivotally connected to an extension arm 33 which in turn is connected to a seed pickup carrier driving arm 34. Seed pickup bar 18 is mounted to a seed pickup bar carrier 35 which is mounted for sliding movement on a stationary shoulder screw 36 and also for pivotal movement by a shoulder screw 38 to the seed pickup carrier driving arm 34. Therefore, during each complete rotation of motor arm 31, seed pickup bar 18 is moved down into seed hopper 14 then upwardly and forwardly to top seed receiving bar 19.

Motor drive arm 32 is also pivotally mounted to a driving arm 40 which rotates by means of a shaft 41 mounted in a brass bushing 42. Seed pickup bar 18 is moved on its other side by shaft 41 which extends through side plate 12 and drives a driving arm 44 which in turn is pivotally mounted to an extension arm 45 which rotates a seed pickup carrier driving arm 46. A seed pickup bar carrier 48 is slidably mounted on a shoulder screw 49 and pivotally mounted to a shoulder screw 50 and reciprocates seed pickup bar 18 in the manner previously described with reference to seed pickup bar carrier 35.

With driving arms 31 and 44 rotating in unison, seed pickup bar 18 is supported on both its ends which provides for a smooth, stress-free reciprocation. A single seed dispensing action which dispenses a seed into a single row of compartments C takes place during each 360 degree rotation of motor arm 31.

Tray Movement Operation

Motor 30 also drives a mechanism which pushes the tray, one row of compartments C at a time, from the entry end of the seed planter 10 from its entry end through its exit end. This is accomplished by a tray carrier driving arm 53. Tray carrier driving arm 53 is mounted for rotation to translation movement by means of a shoulder screw 54 to a switch over arm 55. Switch over arm 55 is rotatably connected by another shoulder screw 56 to a connector arm 58. Connector arm 58 is pivotally mounted by its other end to extension arm 33 and seed pickup carrier driving arm 34. As is shown in FIG. 2, connector arm 58 is connected to motor arm 31 through the motor drive arm 32, extension arm 33 and connector arm 58. Pivotal movement of connector arm 58 pivots switch over arm 55 which causes the tray carrier driving arm 53 to move forwardly.

The end of tray carrier driving arm 53 remote from shoulder screw 54 is mounted by means of a shoulder screw 59 to an elongate tray carrier arm 60 through an elongate slot 61 in side plate 11. Mounted to opposite ends of tray carrier arm 60 are trigger support arms 61 and 62, respectively. Carried on the lower, downwardly extending of trigger support arm 61 is an entry trigger 63, and carried by the lower, downwardly extending arm of trigger support arm 62 is an exit trigger 64. Entry trigger 63 and exit trigger 64 are loosely mounted on the lower end of trigger support arms 61 and 62, respectively and are adapted to rest under their own weight in one of the compartments C. During each forward movement of tray carrier arm 60, either or both of triggers 63 and 64 push the tray forward by bearing against the forward wall of one of the compartments C. During each rearward movement of tray carrier arm 60, either or both of triggers 63 and 64 ride up over the rearward wall of their respective compartments C and drop into a compartment C in the next row of compartments. Then during the next reciprocation, the tray is indexed forward another row.

The tray carrier arm 60 translates from its forward to its rearward position and back by means of two spaced-slots 60A and 60B through which are secured shoulder screws 60C and 60D.

Soil Punching Operation

As summarized above, soil punching means are provided which form a centered depression in the soil of each compartment C to receive the seed. The soil is punched by a vertical punching bar 70 which is mounted for reciprocating up and down motion. Punching bar 70 is provided with two spaced-apart slots 71 and 72 through which are positioned shoulder screws 73 and 74, respectively. Mounted to punching bar 70 is a punch driving arm 75 having a slot 76 on one end which is slidably secured to a shoulder screw 78. Punch driving arm 75 is secured by its other end to an adjustable arm 79. Adjustable arm 79 is mounted to follow the rotation of motor arm 31.

Figure 5:
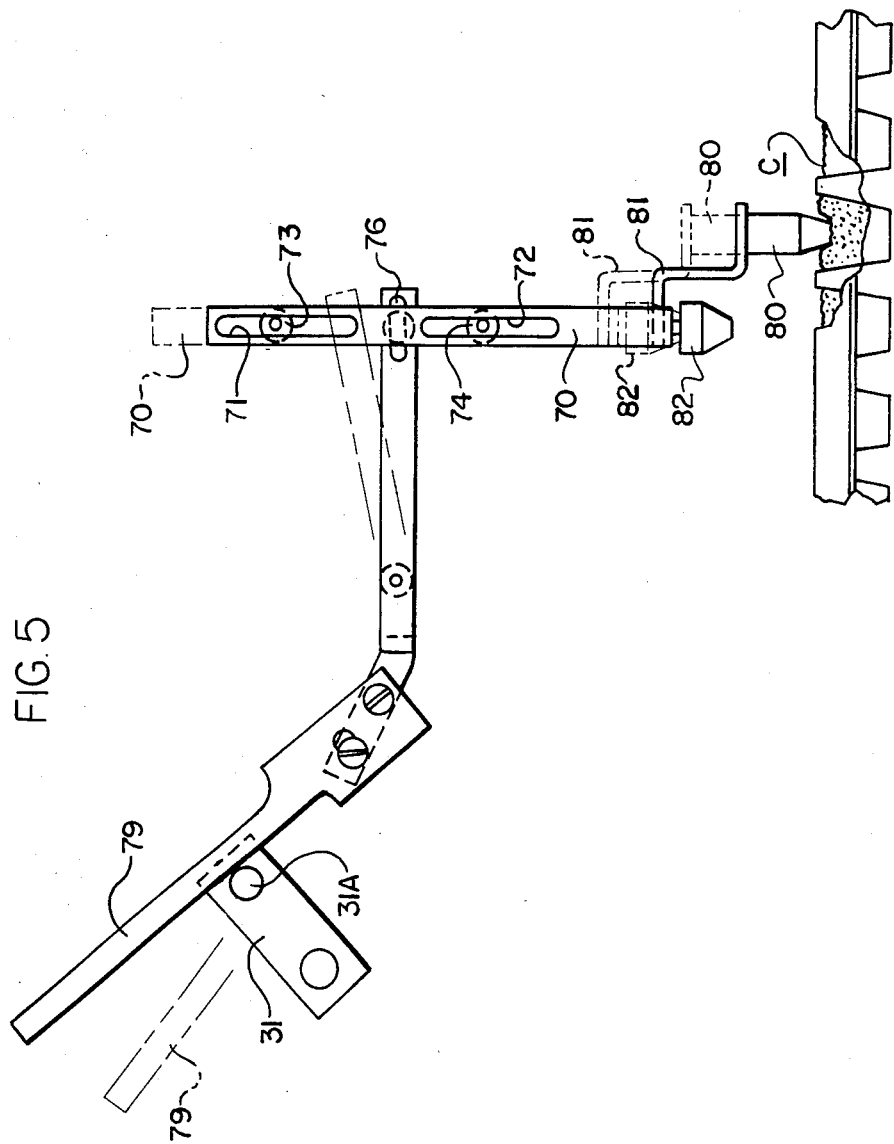
FIG. 5 is a fragmentary, side elevational view showing the soil punch forming a seed-receiving depression in the soil of a compartment.

Referring now to FIG. 5, rotation of motor arm 31 causes shoulder screw 31A to follow along the bottom surface of adjustable arm 79. This causes punching bar 70 to move upwardly and downwardly. At the lowest point of its downward movement twelve punches 80 are depressed slightly into the soil of each compartment in a single row of the tray from one side to the other. As is shown in FIG. 5, the punches 80 are carried by a punch carrier arm 81.

As is shown both in FIGS. 2 and 5, another punch 82 is carried by the lower end of punching bar 70 and is used when larger, deeper trays are seeded, as will be explained further below.

Seed Hopper Vibration

The seed hopper 14 is vibrated by means of a small electric motor 85 having a motor shaft 86. An eccentric weight 87 is mounted on motor shaft 86 and as motor shaft 86 rotates, eccentric weight 87 vibrates motor 85 which vibration is transmitted to seed hopper 14 on which motor 85 is mounted.

Seed Dispenser Timing

It is important to properly time apparatus 10 so that the seeds are dispensed at exactly the correct time. Therefore, a microswitch 88 is mounted on the upper, exit end of apparatus 10. Microswitch 88 includes a curved spring 89 which is depressed by seed pickup bar 18. Microswitch 88 is activated and the seeds are dispensed into apertures 20.

Figure 8:
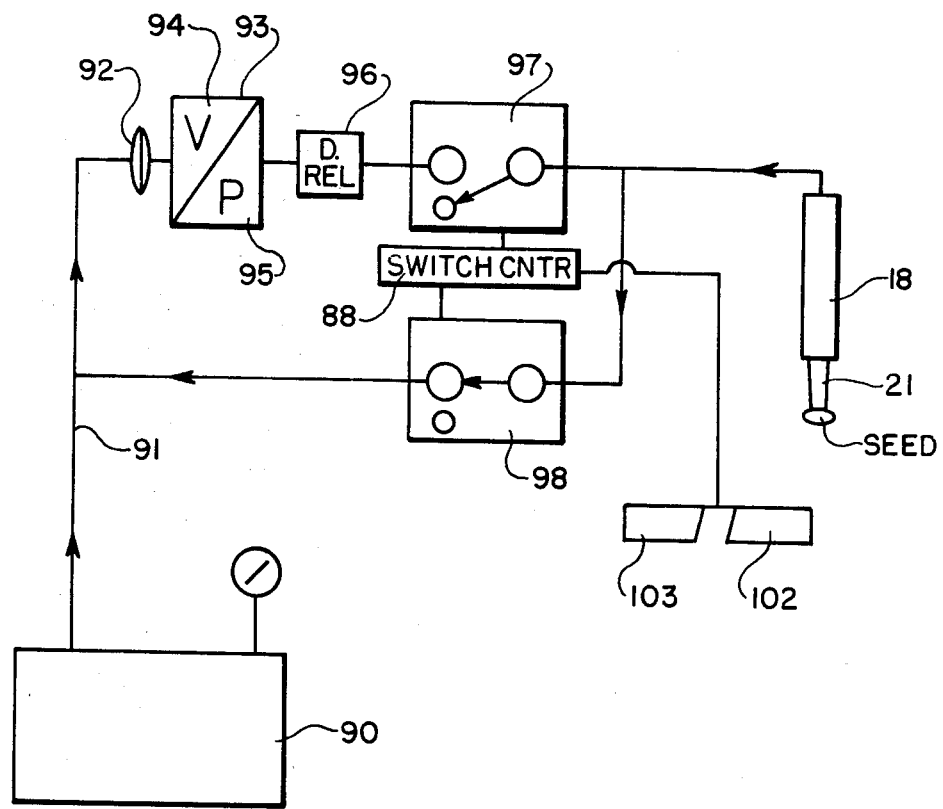
FIG. 8 is a schematic of the pneumatic system of the apparatus showing the system in seed-holding position; and, FIG. 9 shows the pneumatic system in FIG. 8 in seed discharge position.
Figure 9:
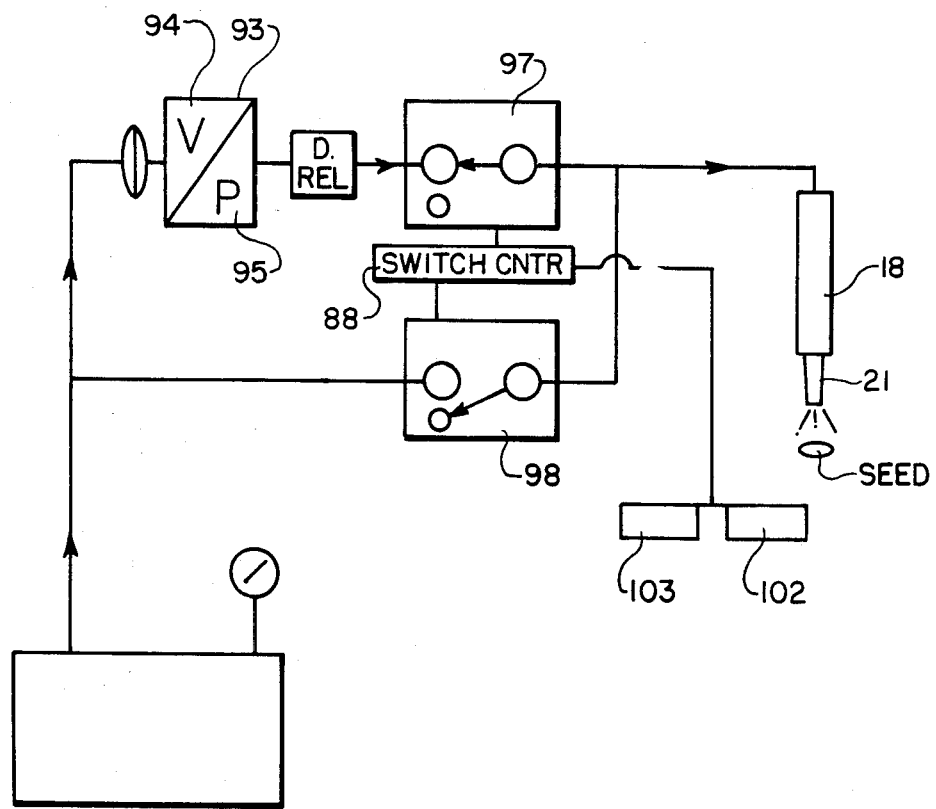

Seed pickup and dispensing is also controlled by a pneumatic system illustrated in FIGS. 8 and 9. Referring specifically to FIG. 8, a seed is shown being held by vacuum pressure on the end of one of the vacuum nozzles 21. The vacuum system is controlled by a vacuum controller 90 and operates by varying the amount of free air drawn into the system. Vacuum controller 90 is connected by suitable vacuum line 91 to an air filter 92 and then to a combination vacuum pump and air compressor 93 having a vacuum side 94 and a pressure side 95. A pressure relief valve 96 is provided for releasing excess air pressure. Two electric solenoid valves 97 and 98 are placed in parallel relation to each other in the pneumatic system. In the view shown in FIG. 8, vacuum pressure is holding the seed on the tip of nozzle 21 through the operation of electric solenoid 98. As is shown, vacuum 98 is in its "ON" positon allowing the flow of air through the vacuum side 94 of compressor 93. When seed pickup bar 18 depresses spring 89 of microswitch 88, the pneumatic system switches to the position shown in FIG. 9, with solenoid 98 in the "OFF" position and solenoid 97 in the "ON" position. In the position shown in FIG. 9, positive air pressure from pressure side 95 of compressor 93 flows through solenoid valve 97 and passes through nozzle 21, exerting positive air pressure and blowing the seed off nozzle 21 and into the apertures 20 of top seed receiving bar 19. As soon as seed pickup bar 18 cycles away from microswitch 88, the pneumatic system resumes the position shown in FIG. 8, re-exerting vacuum pressure on vacuum nozzles 21. Therefore, the system is ready to pick up further seeds from hopper 14 as soon as the nozzles are moved into the hopper 14.

As mentioned above, seed planter 10 is adaptable to various sizes of trays. Trays having a various number of compartments across its length can be used by placing particular nozzles 21 and punches 80 out of operation. The nozzles 21 are controlled by means of valves 100 positioned on the top of seed pickup bar 18.

In addition, a deeper tray than that shown in the drawings can be used by removing seed delivery bar 25 and punch carrier arm 81 and punch 80. This raises the operating level of the machine several inches. In addition, trigger support arms 61 and 62 must be removed and replaced with shorter trigger support arms (not shown) in order to raise the operating level of triggers 63 and 64, as well.

Tray Presence Sensing

In order to make seed planting apparatus 10 as automated as possible, some provision must be made to sense the presence and absence of a tray in seed dispensing position in a tray. When a row of compartments is not in proper position to receive a seed, microswitch 88 is overridden by either a microswitch 102 or 103. Both microswitches 102 and 103 are mounted on the inside of side plate 11 in position to be engaged by a tray as it moves through seed planter 10 from the entry and to the exit end. A relatively low tray, such as is shown in FIG. 2, engages a spring 104 which closes microswitch 103 only when the tray is resting against spring 104. In this position, the pneumatic system operates normally. However, when the tray is pushed towards the exit end to the point where the trailing end of the tray passes past microswitch 103, spring 104 moves outwardly, disengaging microswitch 103 and preventing solenoid valves 97 and 98 from activating to blow the seed off of the nozzle 21.

If a large tray is used with punch 82 and seed delivery bar 25 removed, the microswitch 102 operates in exactly the same way as just described for microswitch 103. Apparatus 10 will continue operating with the seed pickup bar reciprocating between hopper 14 and top seed receiving bar 19. However, the failure of the solenoid valves 97 and 98 to activate prevents seed from being wasted by being dropped into the apertures 20 of top receiving bar 19. Of course, it would be an obvious expedient to also attach an alarm to warn that the last tray had been seeded or to provide a shut-off device to actually stop all of the machine functions.

Detailed Operation

In operation, the seed planter 10 can be set to operate at any given speed simply by turning the speed control knob 30A. A tray is placed just inside the entry end of apparatus 10 and moved forward until the extreme front end of the tray engages microswitch 103. In this position, the entry trigger 63 will be resting in one of the compartments of the tray rearward of microswitch 103 and exit trigger 64 will be forward of the tray. When the machine is turned on, the seed pickup bar is extended downwardly into seed hopper 14. Vacuum directed through nozzles 21 from solenoid 98 releasably secures a seed to the bottom of each of the nozzles 21. At the same time, punching bar 70 is moved downwardly and the soil in the first row of compartments is depressed by punch 80. This occurs in advance of the seed idspensing position represented by the position of the seed delivery bar 25 forward of punch 80. Seed pickup bar 18 reciprocates upwardly out of seed hopper 14 and is moved forward towards the top seed receiving bar 19. Just prior to its reaching the seed discharge position, spring 89 is contacted by seed pickup bar 18 and microswitch 88 is activated. Vacuum pressure is discontinued and positive pressure through nozzle 21 is applied through solenoid valve 97, propelling the seed away from nozzle 21 and into each of the apertures 20 along the top of top seed receiving bar 19. Each of the seeds are propelled down seed delivery tubes 22 and through the opening in the bottom of seed delivery bar 25 and into the row of compartments positioned directly beneath. As the top seed receiving bar 19 moves away from microswitch 88, vacuum to nozzles 21 is resumed.

Figure 3:
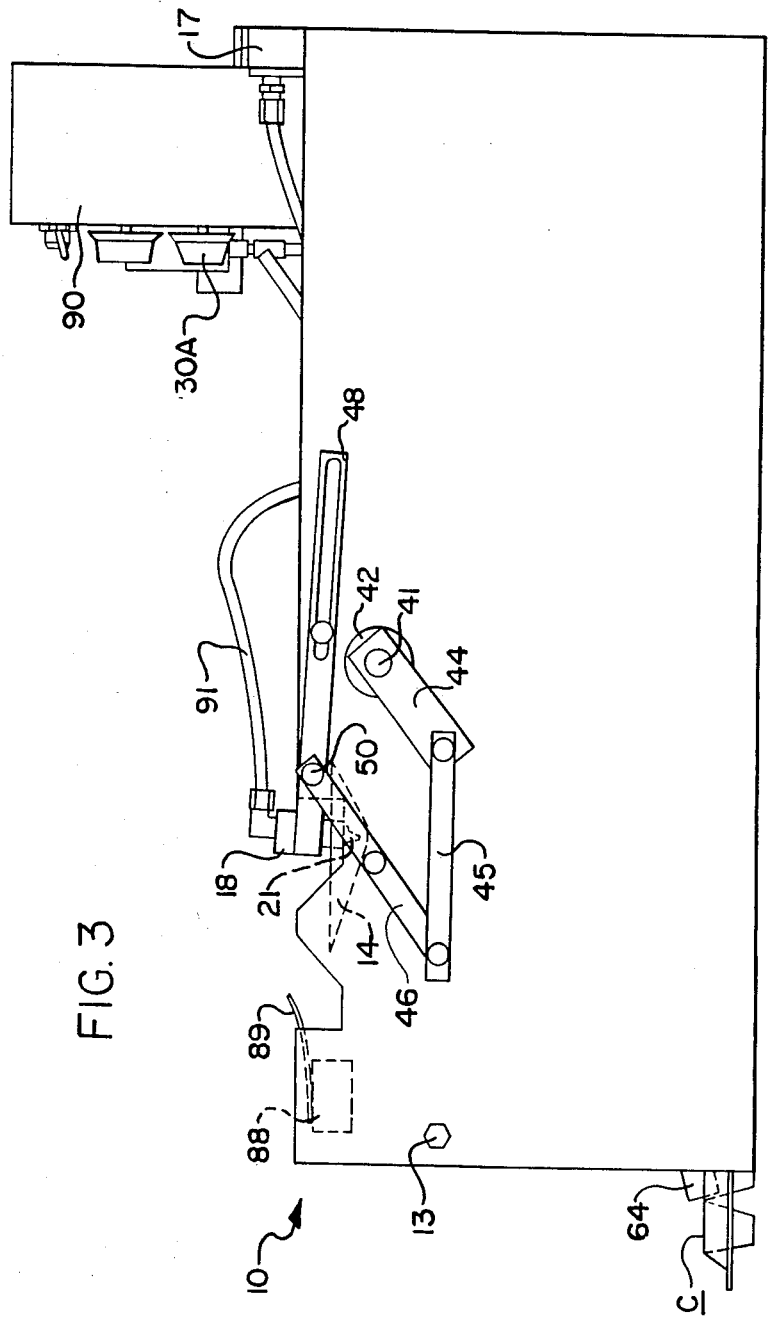
FIG. 3 is a fragmentary side elevational view of the apparatus shown in FIG. 2 from the opposite side thereof in the same seed receiving relation.
Figure 6:
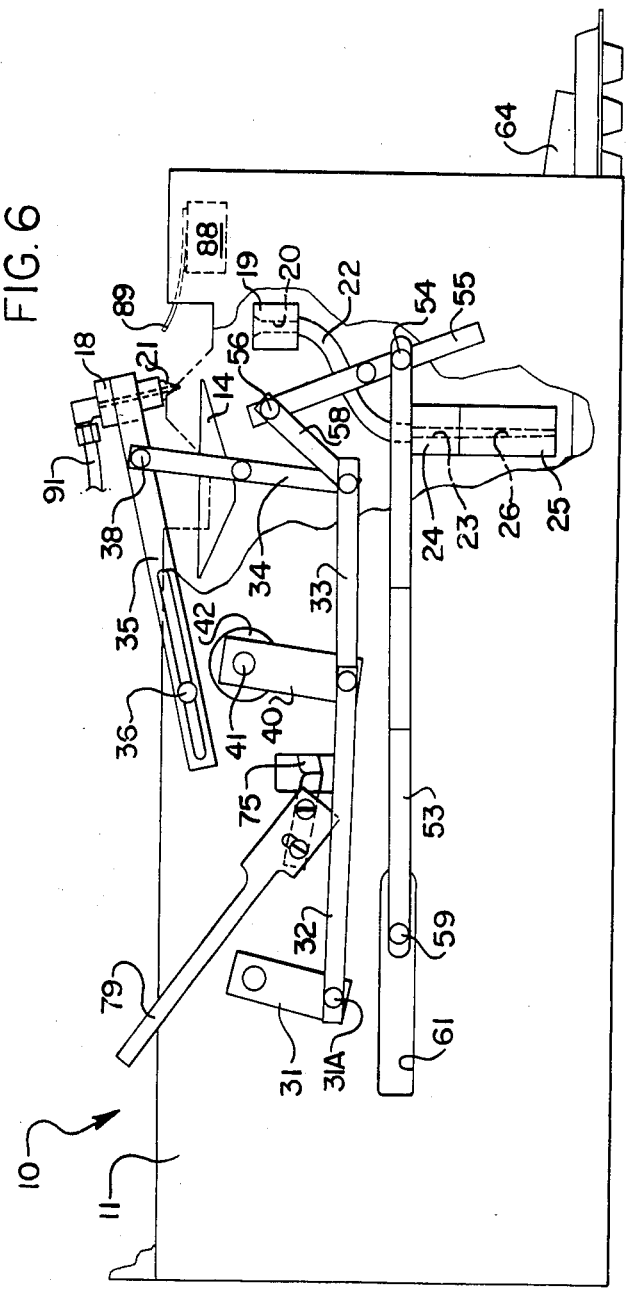
FIG. 6 is a fragmentary, side elevational view of the apparatus, with parts broken away, of the vacuum nozzle of intermediate position between the seed hopper and the seed discharge position.
Figure 7:
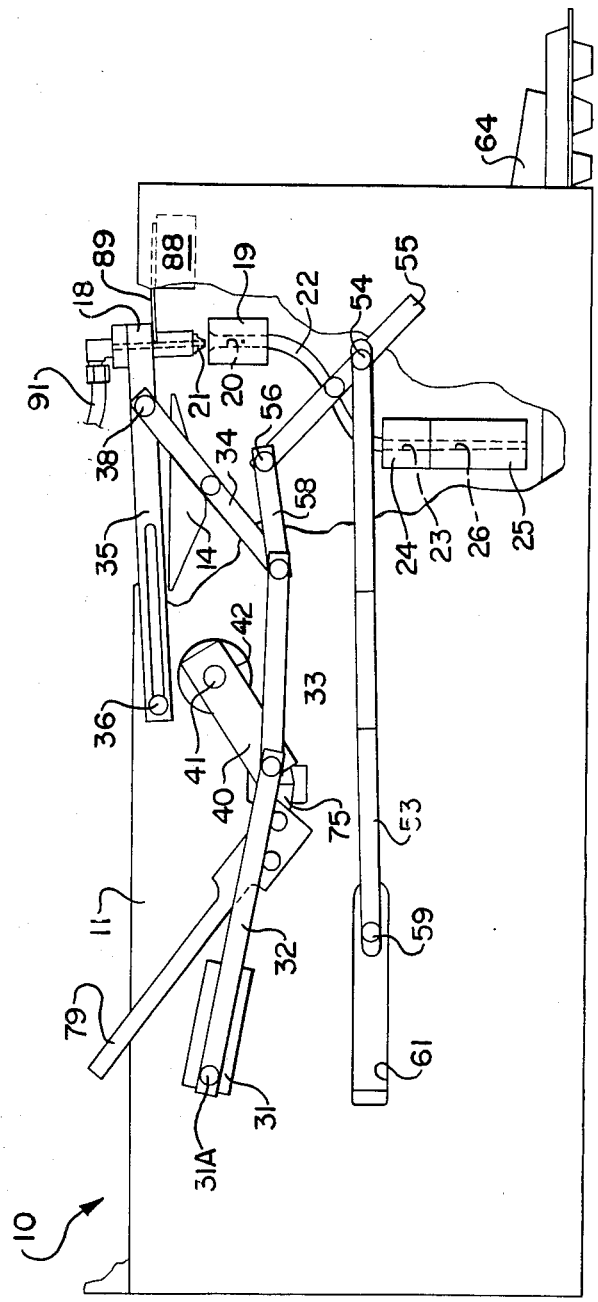
FIG. 7 is a view similar to that shown in FIG. 6 with the vacuum nozzles in seed discharge position.

The intermediate position with nozzles 21 approximately halfway through the cycle from hopper 14 to microswitch 88 is shown in FIG. 6. The discharge position with the bottom of seed pickup bar 18 contacting spring 89 on microswitch 88 is shown in FIG. 7. Note the position of shoulder screw 54. As the reciprocation of seed pickup bar 18 continues back to its position over hopper 14, switch over arm 55 continues its forward movement bringing with it tray carrier driving arm 53. Until the forward end of the tray reaches exit trigger 64, only entry trigger 63 continues to push the tray forward. As tray carrier driving arm 53 moves rearwardly, entry trigger 63 moves over the barrier between adjacent rows of compartments and falls into the next row of compartments. Entry trigger 63 falls into the compartment and, as is shown in FIG. 2, is in position to push the tray forward one more row of compartments upon the movement of tray carrier driving arm 53 forwardly. As shown in FIG. 3, both triggers 63 and 64 are driving the tray forward. However, as soon as the tray moves one more row of compartments forward, entry trigger 63 will cease operating on that particular tray and the function of moving the tray forwardly one row of compartments at a time is carried out only by trigger 64. Ordinarily, a long row of trays will be positioned behind the apparatus 10 so that successive trays are automatically loaded into the machine one by one. Therefore, entry trigger 63 will automatically resume operation when the next tray reaches its operating position.

Since the seed delivery, tray movement and soil punching functions are all coordinated from the same motor arm 31, the machine operates in synchronization no matter what speed the operator sets.

A seed dispensing apparatus has been described above. Various details of the invention may be changed without departing from the scope of the invention. Furthermore, the foregoing description of the preferred embodiment is for the purpose of illustration only and not for the purpose of illustration—the invention being defined by the claims.

I claim:

1. An apparatus for planting seed row-by-row in a compartmented seed germinating tray, comprising:
   (a) a seed hopper;
   (b) a plurality of vertically disposed seed holding vacuum nozzles, each having a tip adapted to receive and hold a seed by means of vacuum applied through the nozzle and mounted for translation reciprocating motion between a vertical seed receiving position in said seed hopper and a laterally spaced-apart vertical seed discharge position wherein a seed is released from each of the nozzles and conveyed through an aperture in a seed delivery bar to the tray for discharge into respective compartments;
   (c) a plurality of soil punchers for forming a seed-receiving depression in the soil of each of a plurality of compartment in a row of the tray in advance of receiving a seed therein, said seed delivery bar including means for positioning the exit point of the seeds to permit an accurate discharge of seed in closely spaced-apart relation into a tray having a relatively shallow depth and in a tray having a relatively greater depth, and wherein said plurality of soil punchers includes readily removeable extension soil punches for being connected to and extending downwardly from the plurality of soil punchers for forming a seed-receiving depression in the bottom of a tray having a relatively shallow depth with said extension soil punchers thereon and in trays having a relatively greater depth with said extension soil punchers removed;
   (d) tray moving means for moving the tray forward to align an empty row of compartments in seed-receiving relation after each reciprocation of said seed holding vacuum nozzles and for moving a seeded tray out of seeding position and moving another tray into seeding position, said tray moving means including;
      (i) said apparatus defining a void through said apparatus from an unseeded tray entrance to a seeded tray exit;
      (ii) a tray entry trigger mounted adjacent the tray entrance on one end of a tray carrier arm;
      (iii) a tray exit trigger mounted adjacent the tray exit on the other end of said tray carrier arm;
      (iv) said tray carrier arm mounted for translational, reciprocating forward and rearward movement, the forward movement of said tray carrier arm causing said tray entry trigger and said tray exit trigger to move forward and thereby move the tray forward by engagement with either one or both of the tray entry trigger or tray exit trigger, depending on the location of the tray within said apparatus and during the rearward movement of said tray carrier arm, said tray entry trigger and said tray exit trigger moving rearwardly to one or the other or both engage a next row of tray compartments depending on the location of the tray or trays within said apparatus; and
   (e) a drive means and a linkage means mechanically communicating said tray moving means, said vacuum nozzles, said seed delivery bar, and said soil punches for operating the apparatus in a sequenced and coordinated manner.

2. An apparatus according to claim 1, wherein said means for positioning the exit point of the seeds comprises an extension bar for being secured to the bottom of the seed delivery bar, said extension bar having apertures communicating with apertures in the seed delivery bar to permit accurate discharge of seed in closely spaced-apart relation into a tray having a relatively shallow depth with said extension bar thereon, and in trays having a relatively greater depth with the extension bar removed.

3. An apparatus for planting seed row-by-row in a compartmented seed germinating tray, comprising:
  (a) a seed hopper;
  (b) a plurality of vertically disposed seed holding vacuum nozzles, each having a tip adapted to receive and hold a seed by means of vacuum applied through the nozzle and mounted for translation reciprocating motion between a vertical seed receiving position in said seed hopper and a laterally spaced-apart vertical seed discharge position wherein a seed is released from each of the nozzles and conveyed through an aperture in a seed delivery bar to the tray for discharge into respective compartments;
  (c) a plurality of soil punchers for forming a seed-receiving depression in the soil of each of a plurality of compartment in a row of the tray in advance of receiving a seed therein;
  (d) tray moving means for moving the tray forward to align an empty row of compartments in seed-receiving relation after each reciprocation of said seed holding vacuum nozzles and for moving a seeded tray out of seeding position and moving another tray into seeding position, said tray moving means including:
    (i) said apparatus defining a void through said apparatus from an unseeded tray entrance to a seeded tray exit;
    (ii) a tray entry trigger mounted adjacent the tray entrance on one end of a tray carrier arm;
    (iii) a tray exit trigger mounted adjacent the tray exit on the other end of said tray carrier arm;
    (iv) said tray carrier arm mounted for translational, reciprocating forward and rearward movement, the forward movement of said tray carrier arm causing said tray entry trigger and said tray exit trigger to move forward and thereby move the tray forward by engagement with either one or both of the tray entry trigger or tray exit trigger, depending on the location of the tray within said apparatus and during the rearward movement of said tray carrier arm, said tray entry trigger and said tray exit trigger moving rearwardly to one or the other or both engage a next row of tray compartments depending on the location of the tray or trays within said apparatus; and
  (e) a single drive motor and associated linkage means for translating and reciprocating said vacuum nozzles into position to release the seed into the aperture in the seed delivery bar, reciprocating said plurality of soil punchers to form seed-receiving depressions in the soil of each compartment, the tray entry trigger mounted adjacent the tray entrance and the tray exit trigger mounted adjacent the tray exit.

4. An apparatus according to claim 3, and including upper and lower, vertically spaced-apart sensing switches which, in an "off" position prevents seed from being dropped into the seed delivery bar, said lower sensing switch being positioned in engaging relation relative to the path of the tray for being activated by a relatively shallow tray and for being deactivated in the absence of a tray, and said upper sensing switch being positioned in engaging relation relative to the path of the tray for being activated by a tray having a relatively greater depth.

* * * * *